US008562034B2

(12) United States Patent
Hirota et al.

(10) Patent No.: US 8,562,034 B2
(45) Date of Patent: Oct. 22, 2013

(54) OPENING-AND-CLOSING MEMBER DRIVE CONTROL APPARATUS FOR VEHICLE

(75) Inventors: Koichi Hirota, Takahama (JP); Nobuyasu Bessho, Toyota (JP); Takashi Tagaito, Toyota (JP); Shinichiro Noda, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 568 days.

(21) Appl. No.: 12/716,526

(22) Filed: Mar. 3, 2010

(65) Prior Publication Data

US 2010/0242363 A1    Sep. 30, 2010

(30) Foreign Application Priority Data

Mar. 24, 2009 (JP) .................... 2009-072707
Jul. 24, 2009 (JP) .................... 2009-173294

(51) Int. Cl.
  *E05C 3/06* (2006.01)
  *E05C 3/00* (2006.01)
(52) U.S. Cl.
  USPC ............................. 292/201; 292/1; 292/216
(58) Field of Classification Search
  USPC ............................. 292/1, 201, 216
  See application file for complete search history.

(56) References Cited

U.S. PATENT DOCUMENTS

| | | | | |
|---|---|---|---|---|
| 4,257,634 A | * | 3/1981 | Kleefeldt et al. | 292/336.3 |
| 4,762,348 A | * | 8/1988 | Matsumoto | 292/201 |
| 4,927,204 A | | 5/1990 | Asada | |
| 5,351,439 A | | 10/1994 | Takeda et al. | |
| 6,459,223 B2 | * | 10/2002 | Mauel et al. | 318/445 |
| 6,499,776 B2 | * | 12/2002 | Takamura | 292/201 |
| 6,669,247 B2 | * | 12/2003 | Swan | 292/201 |
| 6,698,804 B2 | * | 3/2004 | Shiota et al. | 292/201 |
| 6,924,614 B2 | * | 8/2005 | Onozawa et al. | 318/466 |
| 7,874,972 B2 | * | 1/2011 | Hayasaka et al. | 494/12 |
| 2001/0005079 A1 | * | 6/2001 | Takamura | 292/201 |

(Continued)

FOREIGN PATENT DOCUMENTS

| | | |
|---|---|---|
| JP | 06-137029 | 5/1994 |
| JP | 07-166762 | 6/1995 |

(Continued)

OTHER PUBLICATIONS

Japanese Office Action issued on Jul. 2, 2013 by the Japan Patent Office in corresponding Japanese Patent Application No. 2009-173294, and English translation thereof.

*Primary Examiner* — Carlos Lugo
(74) *Attorney, Agent, or Firm* — Buchanan Ingersol & Rooney PC

(57) ABSTRACT

An opening-and-closing member drive control apparatus for a vehicle for driving the opening-and-closing member so as to be opened or closed by means of a driving force of a motor after an idling period or an idling section of the motor includes a moving speed detecting member, calculating means for calculating a moving speed changing value, a determining means for determining a sandwiching of an object on the basis of a relationship between the calculated moving speed changing value and a threshold value, a temperature estimating means for estimating a temperature of the motor on the basis of a rotational speed of the motor, detected in the idling period or the idling section, and correcting means for correcting the threshold value so that a determination sensitivity of the sandwiching of the object becomes greater when the estimated temperature of the motor is low than when the estimated temperature of the motor is high.

5 Claims, 9 Drawing Sheets

(56) References Cited

U.S. PATENT DOCUMENTS

| | | | |
|---|---|---|---|
| 2003/0067175 A1* | 4/2003 | Shiota et al. | 292/201 |
| 2003/0234543 A1* | 12/2003 | Onozawa et al. | 292/201 |
| 2009/0165386 A1* | 7/2009 | Suzuki et al. | 49/282 |
| 2010/0270815 A1* | 10/2010 | Shinoda et al. | 292/201 |
| 2011/0181051 A1* | 7/2011 | Itami et al. | 292/2 |

FOREIGN PATENT DOCUMENTS

| | | |
|---|---|---|
| JP | 2504060 B2 | 6/1996 |
| JP | 2002-038796 A | 2/2002 |
| JP | 3411383 B2 | 5/2003 |
| JP | 2004-242426 | 8/2004 |
| JP | 2007-002589 A | 1/2007 |

* cited by examiner

OPENING-AND-CLOSING MEMBER DRIVE CONTROL APPARATUS FOR VEHICLE

CROSS REFERENCE TO RELATED APPLICATIONS

This application is based on and claims priority under 35 U.S.C. §119 to Japanese Patent Application 2009-072707, filed on Mar. 24, 2009 and Japanese Patent Application 2009-173294, filed on Jul. 24, 2009, the entire content of which is incorporated herein by reference.

TECHNICAL FIELD

This disclosure relates to an opening-and-closing member drive control apparatus for a vehicle for detecting a sandwiching of an object at the time of a closing operation of the opening-and-closing member.

BACKGROUND DISCUSSION

A known opening-and-closing member drive control apparatus for a vehicle is disclosed in, for example, JP3411383B2, JP2007-2589A, JP2504060B2 and JP2002-38796A. For example, according to the opening-and-closing member drive control apparatus for the vehicle disclosed in JP3411383B2, a window glass, serving as the opening-and-closing member, is moved upwardly or downwardly by a driving force of a DC motor, and a driving of the DC motor is controlled so that in a case where an object is sandwiched during the upward or downward movement of the door panel, a sandwiching avoidance process, in which the driving of the DC motor is stopped or the DC motor is rotated in the opposite direction, is executed. The opening-and-closing member drive control apparatus for the vehicle disclosed in JP3411383B2 includes a rotational number detecting means for detecting a rotational number of the DC motor, a rotational torque difference calculating means for calculating a rotational torque difference of the DC motor on the basis of a rotational number difference of the DC motor between the rotational number in an unloaded state and the rotational number in a loaded state, each of which is detected by means of the rotational number detecting means, a determination means for determining whether or not the rotational torque difference, calculated by means of the rotational torque difference calculating means, becomes a predetermined rotational torque difference, and an instruction means for instructing an execution of the sandwiching avoidance process when the rotational torque difference, calculated by means of the rotational torque difference calculating means, becomes the predetermined rotational torque difference. According to the opening-and-closing member drive control apparatus of JP3411383B2, a decreasing degree of the rotational number of the DC motor for determining the sandwiching of the object is determined not in a manner of comparing the rotational number and a threshold value, which is calculated empirically or experimentally, but in a manner of directly calculating a torque (the rotational torque difference) of the DC motor when the sandwiching of the object actually occurs. Therefore, regardless of an assembly state, it may be possible to determine the sandwiching of the object.

However, it is known that a relationship between the rotational number difference of the DC motor and the actual rotational torque difference of the DC motor varies depending on a characteristic of the DC motor that may be affected by a temperature thereof. More specifically, a variation of the rotational torque difference relative to the rotational number difference is small when the DC motor is at a high temperature while the variation of the rotational torque difference relative to the rotational number difference is large when the DC motor is at a low temperature.

Therefore, in a case where the sandwiching of the object is determined on the basis of a relationship between the rotational torque difference of the DC motor, which is calculated on the basis of the rotational number difference of the DC motor, and a predetermined rotational torque difference (the threshold value), the rotational torque difference may be overestimated at the high temperature of the DC motor, and even though the object is not sandwiched, the sandwiching of the object may be mistakenly determined. Further, the rotational torque difference may be underestimated at the low temperature of the DC motor, the determination of the sandwiching may be delayed, and the load at the time of the determination of the sandwiching may become excessive.

A need thus exists for an opening-and-closing member drive control apparatus for a vehicle which is not susceptible to the drawback mentioned above.

SUMMARY

According to an aspect of this disclosure, an opening-and-closing member drive control apparatus for a vehicle for driving the opening-and-closing member so as to be opened or closed by means of a driving force of a motor after an idling period or an idling section of the motor, the opening-and-closing member drive control apparatus for the vehicle includes a moving speed detecting member for detecting a moving speed of the opening-and-closing member, a calculating means for calculating a moving speed changing value including one of a moving speed difference between either a moving speed of the opening-and-closing member in a predetermined section or a standard moving speed defined by a predetermined moving speed and a current moving speed detected subsequently, an integrated value of the moving speed difference, and a moving speed changing amount within a predetermined period, a determining means for determining a sandwiching of an object on the basis of a relationship between the calculated moving speed changing value and a threshold value, a temperature estimating means for estimating a temperature of the motor on the basis of a rotational speed of the motor, detected in the idling period or the idling section, and a correcting means for correcting the threshold value so that a determination sensitivity of the sandwiching of the object becomes greater when the estimated temperature of the motor is low than when the estimated temperature of the motor is high.

According to a further aspect of this disclosure, a door lock device for a vehicle includes a latch mechanism selectively switched to a fully-latched state for holding a vehicle door in a fully-closed state, a half-latched state for holding the vehicle door in a half-closed state, or an unlatched state for not holding the vehicle door, a closing side transmitting member linked to the latch mechanism, a motor, a driving force of which is transmitted to the latch mechanism via the closing side transmitting member after an idling section, driving to switch the latch mechanism from the half-latched state to the fully-latched state, a rotational speed detecting member for detecting a rotational speed of the motor, a calculating means for calculating the rotational speed difference between the rotational speed of the motor detected in the idling section and a current rotational speed of the motor detected subsequently, a determining means for determining a sandwiching of an object on the basis of a relationship between the calculated rotational speed difference and a threshold value, a temperature estimating means for estimating a temperature of the motor on the basis of the rotational speed of the motor, detected in the idling section, and a correcting means for correcting the threshold value so that a determination sensitivity of the sandwiching of the object becomes greater when the estimated temperature of the motor is low than when the estimated temperature of the motor is high.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Figure 1:
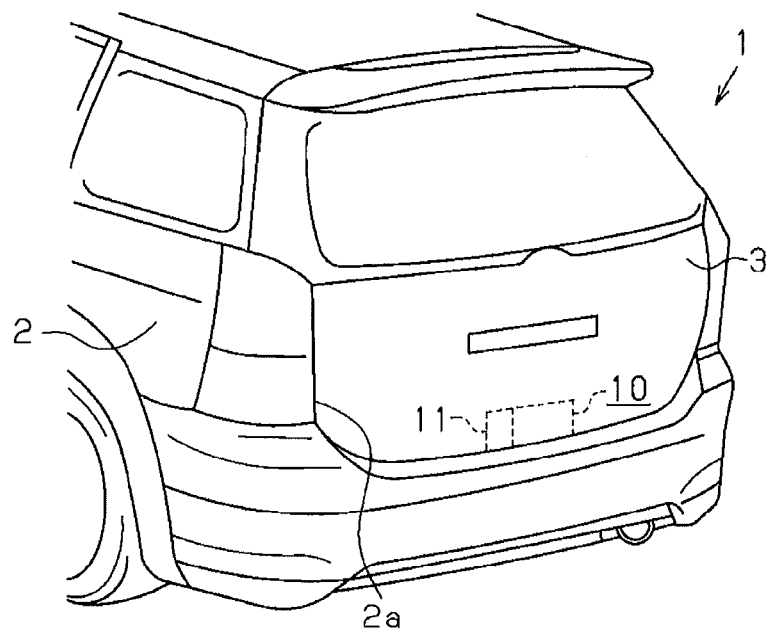
FIG. 1 is a perspective view illustrating a rear portion of a vehicle, on which an opening-and-closing member drive control apparatus for a vehicle according to a first embodiment is mounted.
Figure 2:
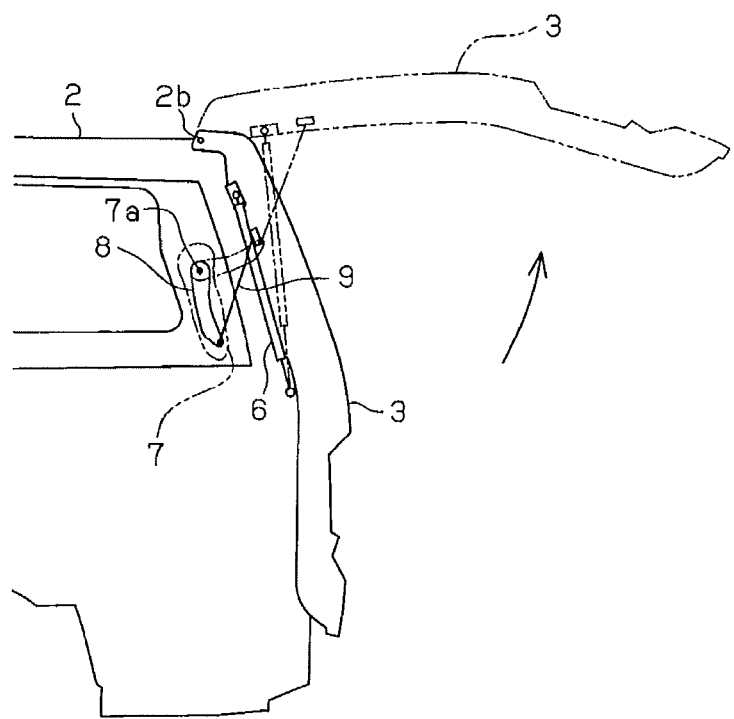
FIG. 2 is a side view illustrating the rear portion of the vehicle according to the first embodiment.

A first embodiment of an opening-and-closing member drive control apparatus for a vehicle 1 (a door lock device for a vehicle) will be described hereinafter with reference to the attached drawings. FIG. 1 is a perspective view illustrating a rear portion of the vehicle 1, on which the opening-and-closing member drive control apparatus for the vehicle according to the first embodiment is mounted. FIG. 2 is a side view illustrating the rear portion of the vehicle 1 according to the first embodiment. As illustrated in FIG. 1, a body (a vehicle body) 2 of the vehicle 1 is formed with an opening portion 2a at a rear portion thereof. A back door 3 (an opening-and-closing member) is attached to the rear portion of the body 2 of the vehicle 1 by means of a door hinge 2b (see FIG. 2), which is provided at an upper portion of the opening portion 2a, and is movable so as to open/close the opening portion 2a (an operation where the back door 3 moves so as to open/close the opening portion 2a will be described hereinafter such that the back door 3 is opened/closed). As illustrated in FIG. 2, the back door 3 is opened in a manner of being pulled upwardly so as to pivot about the door hinge 2b. A gas damper 6, which supports the back door 3, assists the pulling of the back door 3 upwardly, using a reaction force of gas.

A door drive unit 7 is provided at the rear portion of the body 2. The door drive unit 7 includes a first DC motor 71 (see FIG. 7). An output shaft 7a of the first DC motor 71 is connected to an arm 8, formed into a longitudinal shape, so that the arm 8 pivots integrally with the output shaft 7a. An end of the arm 8 is pivotably connected to one end of a rod 9, formed into a bar-shape. The other end of the rod 9 is pivotably connected to the back door 3. When the door drive unit 7 is driven, the arm 8 pivots integrally with the output shaft 7a of the first DC motor 71 so as to push/retract the rod 9, thereby the back door 3, which is supported by the body 2, is driven to be opened/closed.

A striker 4 (see FIG. 3A), formed into a substantially U shape, is fixed at the rear portion of the body 2 while a door lock device 10 (see FIG. 1) is provided at an end portion of an inner surface of the back door 3 so as to face the striker 4, so that the door lock device 10 engages/disengages with/from the striker 4. The door lock device 10 includes a second DC motor 11 (a motor).

Figure 3A:
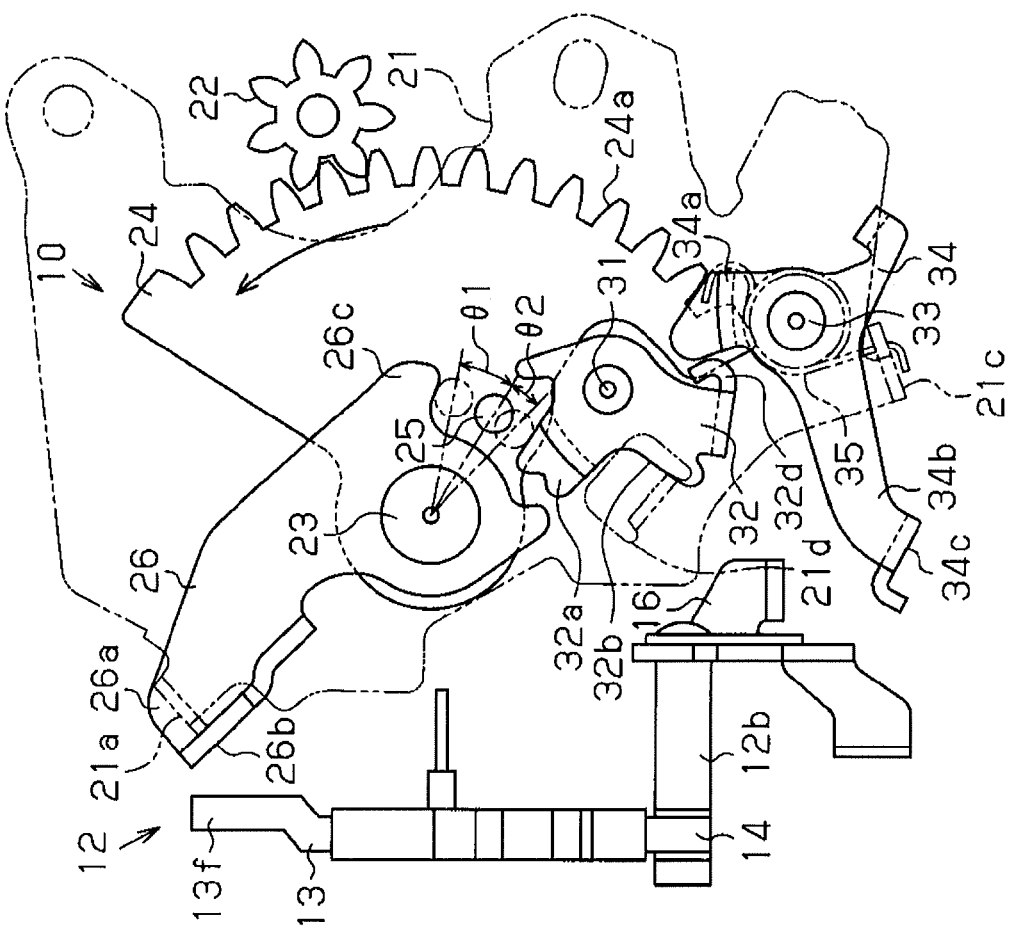
FIG. 3A is a side view illustrating a door lock device according to the first embodiment.
Figure 3B:
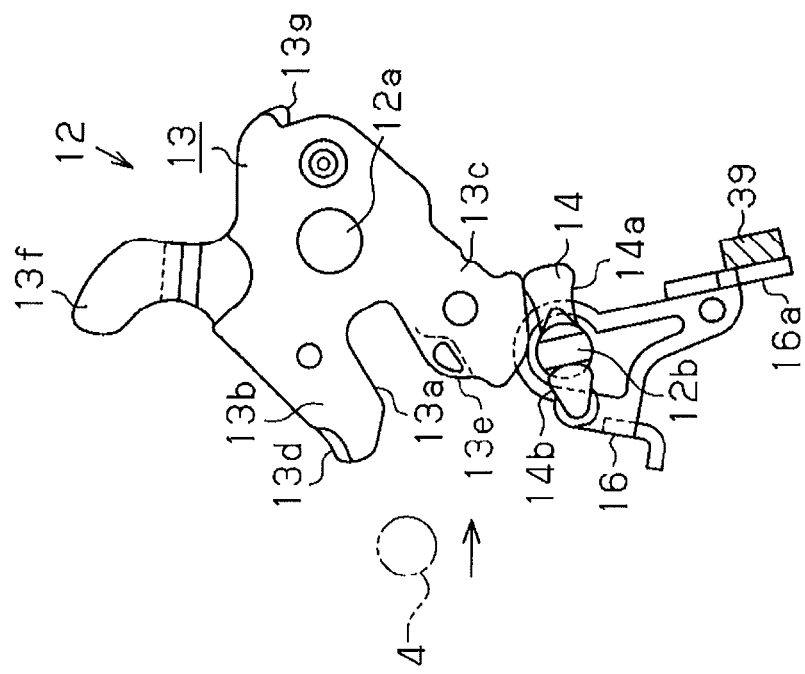
FIG. 3B is a front view illustrating the door lock device according to the first embodiment.

As illustrated in FIGS. 3A and 3B, the door lock device 10 includes a latch mechanism 12, which is supported by the back door 3 via a base plate fixed at the back door 3. The latch mechanism 12 includes a latch 13 and a pawl 14. The latch 13 and the pole 14 are pivotably connected to a first pivot shaft 12a and a second pivot shaft 12b, respectively, which are provided at the base plate so as to be in parallel with each other. The latch mechanism 12 is configured to be engagable/disengagable with/from the striker 4.

More specifically, the latch 13, formed into a substantially U shape, includes an engagement recessed portion 13a. The latch 13 is formed with a first protruding portion 13b at one side of the engagement recessed portion 13a (at a position pivoted from the engagement recessed portion 13a in a clockwise direction in FIG. 3A) and a second protruding portion 13c at the opposite side of the engagement recessed portion 13a (at a position pivoted from the engagement recessed portion 13a in a counter-clockwise direction in FIG. 3A). A first engagement portion 13d is formed at an end portion of the first protruding portion 13b on a side opposite from the engagement recessed portion 13a. A second engagement portion 13e is formed at an end portion of the second protruding portion 13c on a side facing the first engagement portion 13a. The latch 13 is formed with a driven protruding portion 13f, which extends in an opposite direction of the engagement recessed portion 13a so as to dispose the first pivot shaft 12a between the driven protruding portion 13f and the engagement recessed portion 13a. The latch 13 is engaged with one end of a latch biasing spring, the other end of which is held at the base plate, thereby being biased so as to pivot in the clockwise direction in FIG. 3A. Further, when an opposing surface 13g opposite to the first protruding portion 13b contacts a latch stopper, provided at the base plate, further pivoting of the latch 13 in the clockwise direction in FIG. 3A is restricted and the latch 13 is held at a predetermined pivotal position shown in FIG. 3A.

The pawl 14 is connected to a lift lever 16 via the second pivot shaft 12b so as to pivot integrally with the lift lever 16 about the second pivot shaft 12b. The pawl 14 is formed with an engagement end portion 14a, which extends from the second pivot shaft 12b in one direction (in a right direction in FIG. 3A), and an extending end portion 14b, which extends from the second pivot shaft 12b in the substantially opposite direction (in a left direction in FIG. 3A). The pawl 14 is engaged with one end of a pawl biasing spring, the other end of which is held at the base plate, and thereby being biased so as to pivot in the counter-clockwise direction in FIG. 3A (in a direction where the engagement end portion 14b pivots upwardly in FIG. 3A). Further, when a stopper contacting portion 16a of the lift lever 16, which is connected to the pawl 14, contacts a stopper 39, formed at the base plate, further pivoting of the pawl 14 in the counter-clockwise direction in FIG. 3A is restricted, and the pawl 14 is held at a predetermined pivotal position shown in FIG. 3A.

A basic operation of the latch mechanism 12 will be described hereinafter. In a state where the back door 3 is open, as illustrated in FIG. 3A, the opposing surface 13g opposite to the first protruding portion 13b contacts the latch stopper so that the latch 13 is held at the predetermined pivotal position, and the engagement recessed portion 13a faces a path of the striker 4, along which the striker 4 advances in response to a closing operation of the back door 3. Further, the lift lever 16 contacts the stopper 39 so that the pawl 14 is held at the predetermined position, and the engagement end portion 14a is positioned at a lower portion of the second protruding portion 13c. Such state of the latch mechanism 12 is referred to as an unlatched state (a released state).

Subsequently, in response to the closing operation of the back door 3, the striker 4 advances into the engagement recessed portion 13a while thrusting an inner wall surface of the engagement recessed portion 13a, thereby the latch 13 pivots in the counter-clockwise direction in FIG. 3A against a biasing force of the latch biasing spring. When the second engagement portion 13e engages with the engagement end portion 14a, the latch 13 stops to pivot. At that time, the back door 3 is in a half-closed state where the back door 3 engages with the striker 4 at the engagement recessed portion 13a so as not to release the striker 4. Such state of the latch mechanism 12 is referred to as a half-latched state.

Subsequently, in response to the further closing operation of the back door 3, the striker 4 further advances into the engagement recessed portion 13a while thrusting the inner wall surface of the engagement recessed portion 13a, thereby the latch 13 further pivots in the counter-clockwise direction in FIG. 3A against the biasing force of the latch biasing spring. When the first engagement portion 13d engages with the engagement end portion 14a, the latch 13 stops to pivot. At that time, the back door 3 is in a fully-closed state where the back door 3 engages with the striker 4 at the engagement recessed portion 13a so as not to release the striker 4. Such state of the latch mechanism 12 is referred to as a fully-latched state (an engaged state).

On the other hand, when the pawl 14, being in the half-latched state or in the fully-latched state, pivots in the clockwise direction in FIG. 3A against the biasing force of the pawl basing spring, the engagement between the engagement end portion 14a and the second engagement portion 13e or between the engagement end portion 14a and the first engagement portion 13b is released. At that time, the latch 13 is biased by the latch biasing spring so as to pivot in the clockwise direction in FIG. 3A while thrusting the striker 4 at the inner wall surface of the engagement recessed portion 13a. The back door 3 may be opened when the engagement between the engagement recessed portion 13a and the striker 4 is released.

As illustrated in FIG. 3B, the door lock device 10 includes a bracket 21, made of a metal plate, and fixed to the back door 3. A pinion 22, which is connected to an output shaft of the second DC motor 11 so as to integrally rotate therewith, is provided at the bracket 21. An active lever 24, made of a metal plate and formed into a substantially sector shape, is connected to the bracket 21 so as to be pivotable about a third pivot shaft 23 whose axis extends in a different direction from axes of the first and second pivot shafts 12a and 12b of the latch 13 and the pawl 14, respectively, and in parallel with an axis of the pinion 22. The active lever 24 is formed with a gear portion 24a, which extends along an arc-shaped end portion of the active lever 24 so as to engage with the pinion 22. A pivotal position of the active lever 24 is held by an engagement between the gear portion 24a of the active lever 24 and the pinion 22. As illustrated in FIG. 3B, the active lever 24 is normally held at a predetermined position (an original position) where the active lever 24 engages with the pinion 22 at a substantially intermediate portion of the gear portion 24a in a circumferential direction of the active lever 24. The second DC motor 11 is normally set to be a predetermined original rotational position, which corresponds to the original position of the active lever 24. Further, the active lever 24 includes an active lever pin 25, which is formed so as to protrude from the vicinity of the third pivot shaft 23 in a direction corresponding to a thickness of the active lever 24 (in a direction orthogonally protruding from a sheet surface of FIG. 3B) so as to be in parallel with the axis of the third pivot shaft 23.

A passive lever 26 (a closing side transmitting member), made of a metal plate, is connected to the bracket 21 so as to be pivotable about the third pivot shaft 23. The passive lever 26 includes a passive lever portion 26a, which extends from the third pivot shaft 23 in a radial direction the third pivot shaft 23. An end portion of the passive lever portion 26a is bent and the bent portion of the passive lever portion 26a forms a first thrusting tab 26b. The driven protruding portion 13f of the latch 13 is arranged on a pivot path, along which the first thrusting tab 26b of the passive lever 26 in a position shown in FIG. 3B pivots in a counter-clockwise direction in FIG. 3B. When the passive lever 26 pivots in the counter-clockwise direction in FIG. 3B, the first thrusting tab 26b thrusts the driven protruding portion 13f of the latch 13 so that the latch 13 pivots in the counter-clockwise direction in FIG. 3A until contacting the pawl 14 so as to stop to pivot (see FIGS. 4A and 4B). Thus, the latch mechanism 12 is switched to the fully-latched state.

Figure 5:
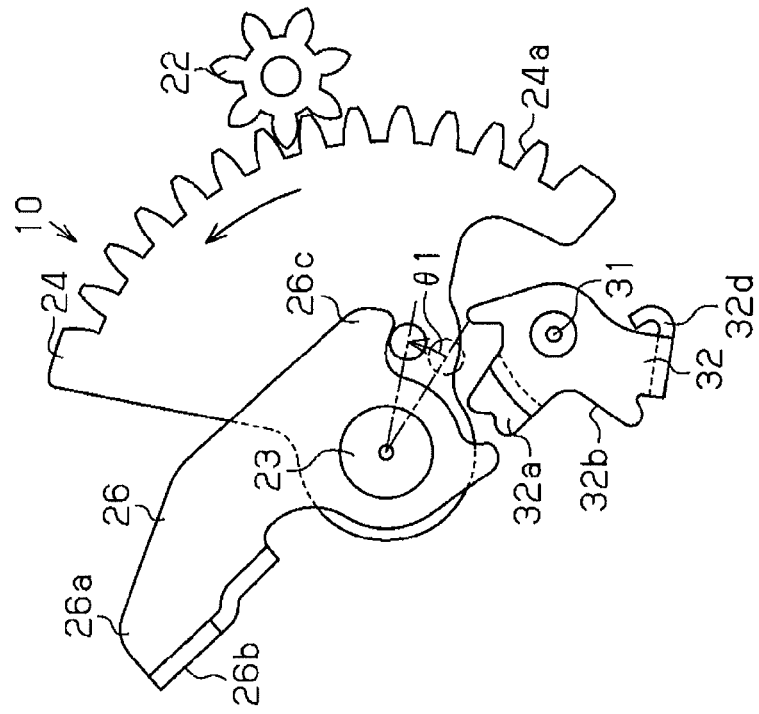
FIG. 5 is a front view illustrating the operation of the door lock device according to the first embodiment.

A first engagement tab 26c is formed at a base end portion of the passive lever 26. The first engagement tab 26c is arranged on a pivot path, along which the active lever pin 25 in a position shown in FIG. 3B moves in the counter-clockwise direction in FIG. 3B. The passive lever 26 is engaged with one end of a retraction spring, the other end of which is held at the bracket 21, and thereby being biased so as to pivot in a clockwise direction in FIG. 3B. Further, when a surface of the first thrusting tab 26b facing the bracket 21 contacts a passive lever stopper 21a, formed at the bracket 21, further pivoting of the passive lever 26 in the clockwise direction in FIG. 3B is restricted, and the passive lever 26 is held at a predetermined pivotal position (a closing operation original position) shown in FIG. 3B. When the passive lever 26 is in the closing operation original position, a angle between the active lever pin 25 of the active lever 24, which is held at the original position, and the first engagement tab 26c of the passive lever 26 is set to be a first predetermined angle θ1, centering the axis of the third shaft 23. The active lever 24 idly pivots from the original position in the counter-clockwise direction in FIG. 3B by the first predetermined angle θ1 until the active lever pin 25 contacts the first engagement tab 26c (see FIG. 5). After the active lever pin 25 of the active lever 24 contacts the first engagement tab 26c, the active lever 24 further pivots in the counter-clockwise direction in FIG. 3B while thrusting the first engagement tab 26c by means of the active lever pin 25. Consequently, the passive lever 26 pivots in the counter-clockwise direction in FIG. 3B, and thereby the latch mechanism 12 is switched to the fully-latched state.

Subsequently, when the active lever 24 pivots in the clockwise direction in FIG. 3B so as to return to the original position, the engagement between the passive lever 26 and the active lever pin 25 is released, and the passive lever 26 is biased by the retraction spring so as to be pivotably retracted to the closing operation original position. Then, the engagement between the latch 13 and the passive lever 26 is released.

A bell crank 32 (an opening side transmitting member), made of a metal plate, is connected to the bracket 21 so as to be pivotable about a fourth pivot shaft 31, which is in parallel with the third pivot shaft 23. The bell crank 32 includes a first lever portion 32a, which extends from the fourth pivot shaft 31 in one radial direction of the fourth pivot shaft 31 (in an upper-left direction in FIG. 3B), and a second lever portion 32b, which extends from the fourth pivot shaft 31 in the substantially opposite radial direction of the fourth pivot shaft 32 (in a lower direction in FIG. 3B). When the second lever potion 32b contacts a lever stopper 21d, formed at the bracket 21, further pivoting of the bell crank 32 in the clockwise direction in FIG. 3B is restricted, and the bell crank 32 is held at a predetermined pivotal position (a release operation original position). When the bell crank 32 is in the release operation original position, the second lever portion 32a is positioned on a pivot path, along which the active lever pin 25 in a position shown in FIG. 3B pivots in the clockwise direction in FIG. 3B about the third pivot shaft 23. An end portion of the bell crank 32 is bent and a second thrusting tab 32d is formed at the bent portion of the bell crank 32.

An open lever 34, made of a metal plate, is connected to the bracket 21 so as to be pivotable about a fifth pivot shaft 33, which is in parallel with the third and fourth pivot shafts 23 and 31. The open lever 34 includes a third lever portion 34a, which extends from the fifth pivot shaft 33 in one radial direction of the fifth pivot shaft 33 (in an upper direction in FIG. 3B), and a fourth lever portion 34b, which extends from the fifth pivot shaft 33 in the substantially opposite radial direction of the fifth pivot shaft 33 (in a lower-left direction in FIG. 3B). The third lever portion 34a is arranged on a pivot path, along which the second thrusting tab 32d in a position shown in FIG. 3B pivots about the fourth pivot shaft 31 in the counter-clockwise direction in FIG. 3B. When the bell crank 32 pivots in the counter-clockwise direction in FIG. 3B, the bell crank 32 thrusts the third lever portion 34a by means of the second thrusting tab 32d, and thereby the open lever 34 pivots in the clockwise direction in FIG. 3B.

An end portion of the fourth lever portion 34b of the open lever 34 is bent, and a third thrusting tab 34c is formed at the bent portion of the fourth lever portion 34b. The lift lever 16 is arranged on a pivot path, along which the fourth thrusting tab 34b in a position shown in FIG. 3B pivots about the fifth pivot shaft 33 in the clockwise direction in FIG. 3B. When the open lever 34 pivots in a clockwise direction in FIG. 4B, in a state where the latch mechanism 12 is in the fully-latched state (see FIG. 4B), the open lever 34 thrusts the lift lever 16 by means of the third thrusting tab 34c, and thereby the lift lever 16 pivots in the clockwise direction in FIG. 4B integrally with the pawl 14 so as to allow pivoting of the latch 13, which is stopped by the pawl 14. Thus, the latch mechanism 12 is switched to the unlatched state.

Figures 4A, 4B:
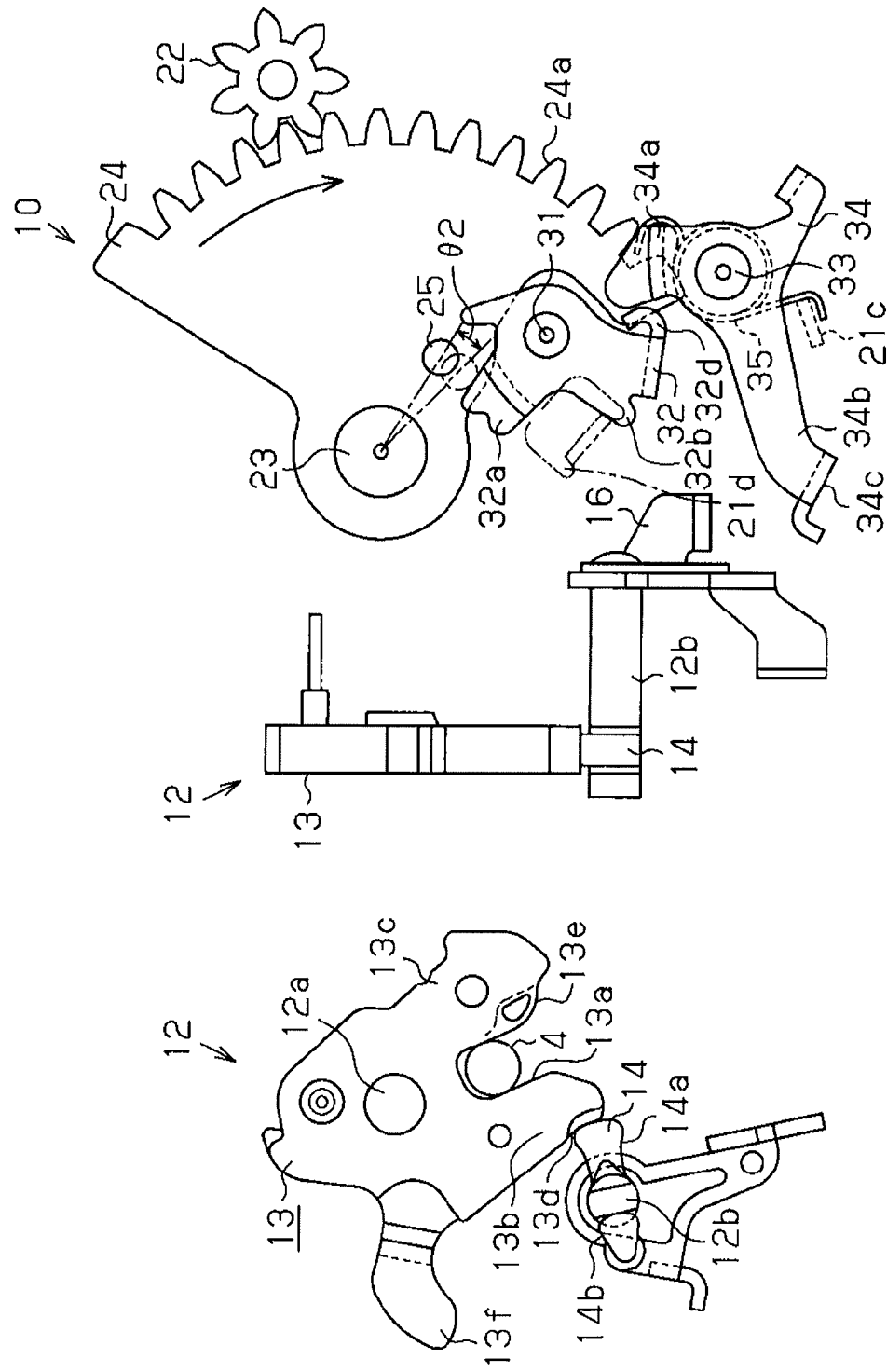
FIG. 4A is a side view illustrating an operation of the door lock device according to the first embodiment.
FIG. 4B is a front view illustrating the operation of the door lock device according to the first embodiment.

The open lever 34 is engaged with one end of a retraction spring 35, the other end of which is held at a second engagement tab 21c formed at the bracket 21, thereby being biased so as to pivot in a counter-clockwise direction in FIG. 4B. When a surface of the third lever portion 34a, facing the third thrusting tab 32d, contacts the third thrusting tab 32d of the bell crank 32, which is held at the release operation original position so as not to pivot, further pivoting of the open lever 34 in the counter-clockwise direction in FIG. 4B is restricted, and thereby the open lever 34 is held at a predetermined pivotal position shown in FIG. 4B.

Figure 6:
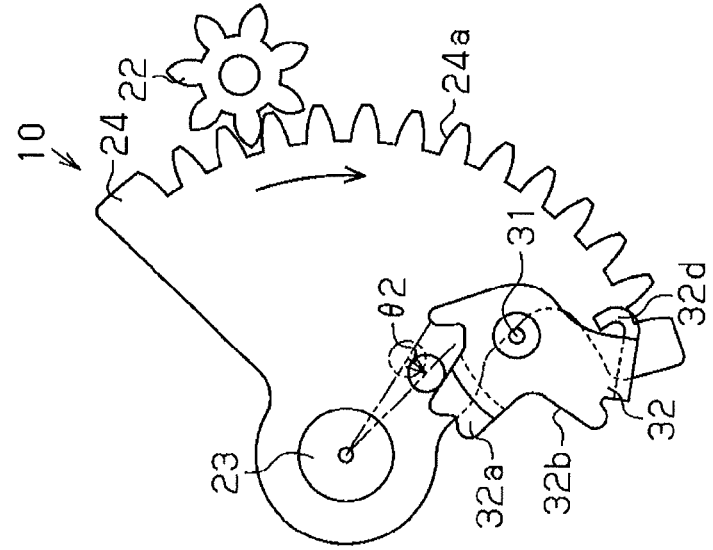
FIG. 6 is a front view illustrating the operation of the door lock device according to the first embodiment.

In other words, the bell crank 32 is biased by the retraction spring 35 via the open lever 34 and is held at the release operation original position. When the bell crank 32 is in the release operation original position, an angle between the active lever pin 25 of the active lever 24, which is held at the original position, and the first lever portion 32a of the bell crank 32 is set to be a second predetermined angle θ2, centering the axis of the third shaft 23. The active lever 24 idly pivots from the original position in the clockwise direction in FIG. 4B by the second predetermined angle θ2 until the active lever pin 25 contacts the first lever portion 32a (see FIG. 6). After the active lever pin 25 of the active lever 24 contacts the first lever portion 32a, the active lever 24 further pivots in the clockwise direction in FIG. 4B while thrusting the first lever portion 32a by means of the active lever pin 25. Consequently, the bell crank 32 pivots in the counter-clockwise direction in FIG. 4B while thrusting the third lever portion 34a of the open lever 34 by means of the third thrusting tab 32d. Then, the open lever 34 pivots in the clockwise direction in FIG. 4B, and thereby the latch mechanism 12 is switched to the unlatched state.

Subsequently, when the active lever 24 pivots in the counter-clockwise direction in FIG. 4B so as to return to the original position, the bell crank 32 and the open lever 34 are released from the thrusting by means of the active lever pin 25, and thereby being biased by the retraction spring 35 so as to pivot to return to the release operation original position and the predetermined pivotal position, respectively. Further, the lift lever 16 (the pawl 14) is released from the thrusting by means of the open lever 34. The second predetermined angle θ2 is set to be smaller than the first predetermined angle θ1.

Figure 7:
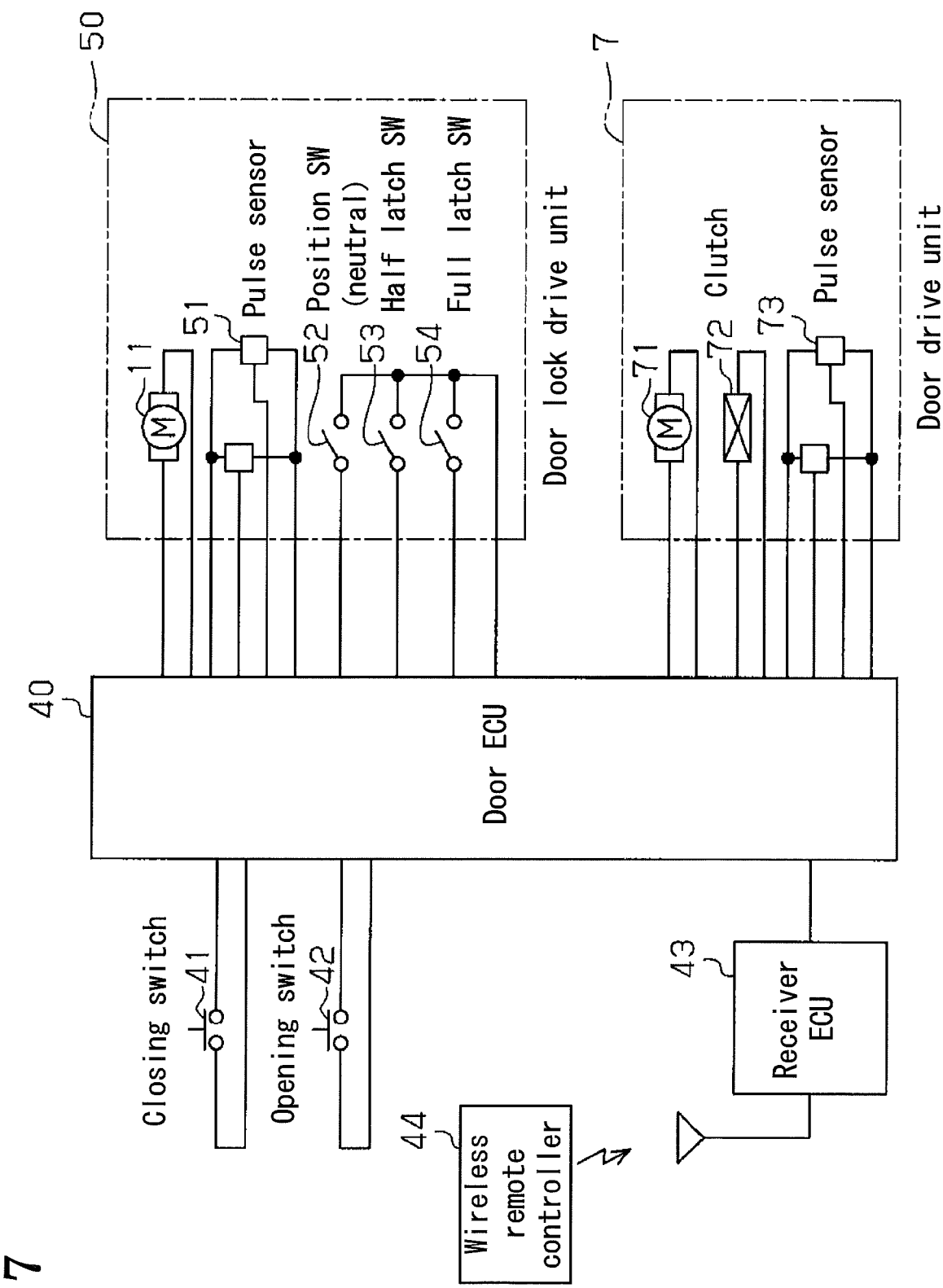
FIG. 7 is a block diagram illustrating an electrical configuration of the opening-and-closing member drive control apparatus for the vehicle according to the first embodiment.

An electrical configuration of the opening-and-closing member drive control apparatus for the vehicle 1 will be described hereinafter. FIG. 7 is a block diagram illustrating the electrical configuration of the opening-and-closing member drive control apparatus for the vehicle 1 according to the first embodiment. As illustrated in FIG. 7, a door Electronic Control Unit (a door ECU) 40 (a calculating means, a determining means, a temperature estimating means, a correcting means), which is provided at the vehicle 1, is configured mainly by, for example, a microcontroller (MCU), and is electrically connected to the door drive unit 7. The door drive unit 7 includes the first DC motor 71, an electromagnetic clutch 72 and a first pulse sensor 73. The door ECU 40 controls driving of the first DC motor 71 in order to control opening and closing of the back door 3. The door ECU 40 controls driving of the electromagnetic clutch 72 so that a power transmission between the first DC motor 71 and the arm 8 (the back door 3) is connected/disconnected. The door ECU 40 connects the power transmission when the back door 3 is electrically driven so as to be opened/closed while the door ECU 40 disconnects the power transmission when the back door 3 is manually operated, in order to smoothly operate the opening and closing of the back door 3. The door ECU 40 detects a rotational direction (a normal rotation or a reverse rotation), an amount of rotation, a rotational speed of the first DC motor 71 (an opening/closing position and an opening/closing speed (a moving speed) of the back door 3) and the like, on the basis of a pair of pulse signals, having different phases and being outputted from the first pulse sensor 73. The door ECU 40 controls the driving of the first DC motor 71 on the basis of the pulse signals outputted from the first pulse sensor 73 so that, for example, the opening/closing speed of the back door 3 equals a target opening/closing speed.

Further, the door ECU 40 is electrically connected to a door lock drive unit 50 for electrically driving the door lock device 10. The door lock drive unit 50 includes the second DC motor 11, a second pulse sensor 51 (a moving speed detecting member, a rotational speed detecting member), a position switch 52, a half latch switch 53 and a full latch switch 54. The door ECU 40 controls driving of the second DC motor 11 in order to control pivoting of the active lever 24 via the pinion 22, thereby controlling the switching of the latch mechanism 12. The door ECU 40 detects a rotational direction (a normal rotation or a reverse rotation), a rotational amount (a stroke), a rotational speed N of the second DC motor 11 (a pivotal position and a pivotal speed of the active lever 24) and the like, on the basis of a pair of pulse signals, having different phases and being outputted from the second pulse sensor 51. The door ECU 40 detects that: the active lever 24 is at the original position on the basis of a detection signal outputted from the position switch 52; the latch mechanism 12 is in the half-latched state (the latch 13 is in a position corresponding to the half-latched state) on the basis of a detection signal outputted from the half latch switch 53; and the latch mechanism 12 is in the fully-latched state (the latch 13 is in a position corresponding to the fully-latched state) on the basis of a detection signal outputted from the full latch switch 54. Thus, the door ECU 40 controls the driving of the second motor 11 on the basis of the pulse signals outputted from the pulse sensor 51 and the detection signals outputted from the position switch sensor 52, the half latch sensor 53 and the full latch sensor 54.

Furthermore, the door ECU 40 is electrically connected to a closing switch 41, an opening switch 42 and a receiver ECU 43 that is adapted to the vehicle 1. The closing switch 41 outputs an operational signal for executing the closing operation on the back door 3 in response to an operation of an occupant. The door ECU 40 controls the driving of the door drive unit 7 (the first DC motor 71 and the electromagnetic clutch 72) on the basis of the operational signal so as to execute the closing operation on the back door 3, which is in an opened state, and thereby the latch mechanism 12 is switched to the half-latched state. When the door ECU 40 detects that the latch mechanism 12 is in the half-latched state, the door ECU 40 controls the driving of the door lock drive unit 50 (the second DC motor 11), and thereby switching the latch mechanism 12 to the fully-latched state.

The opening switch 42 outputs an operational signal for opening the back door 3 in response to an opening operation of the occupant. The door ECU 40 controls the driving of the door lock unit 50 (the second DC motor 11) on the basis of the operational signal so as to switch the latch mechanism 12 from the fully-latched state (the half-latched state) to the unlatched state. Subsequently, the door ECU 40 controls the driving of the door drive unit 7 (the first DC motor 71 and the electromagnetic clutch 72) so as to execute an opening operation on the back door 3, which is in a state to be open.

The receiver ECU 43 configures a wireless communication system between the receiver ECU 43 and a wireless remote controller 44, carried by the occupant. The receiver ECU 43 receives a transmission signal for executing the opening/closing operation on the back door 3, which is transmitted in response to an operation of the wireless remote controller 44, applies a predetermined process to the transmitted signal, and outputs the processed signal to the door ECU 40. The door ECU 40 controls the driving of the door drive unit 7 (the first DC motor 71 and the electromagnetic clutch 72) so as to execute the opening/closing operation on the back door 3, and controls the driving of the door lock drive unit 50, on the basis of the signal outputted from the receiver ECU 43.

A manner of controlling the door lock device 10 (the door lock drive unit 50) by means of the door ECU 40 at the time of executing the closing operation on the back door 3 will be described hereinafter. According to the first embodiment, a rotational torque difference (which corresponds to a load) is determined on the basis of a rotational speed difference (a moving speed changing value) between a rotational speed of the second DC motor 11 in an unloaded state and a rotational speed of the second DC motor 11 in a loaded state. Further, a characteristic of the second DC motor 11, which may be affected by the temperature thereof, (a temperature characteristics of the second DC motor 11) is reflected to the determination.

Figure 8:
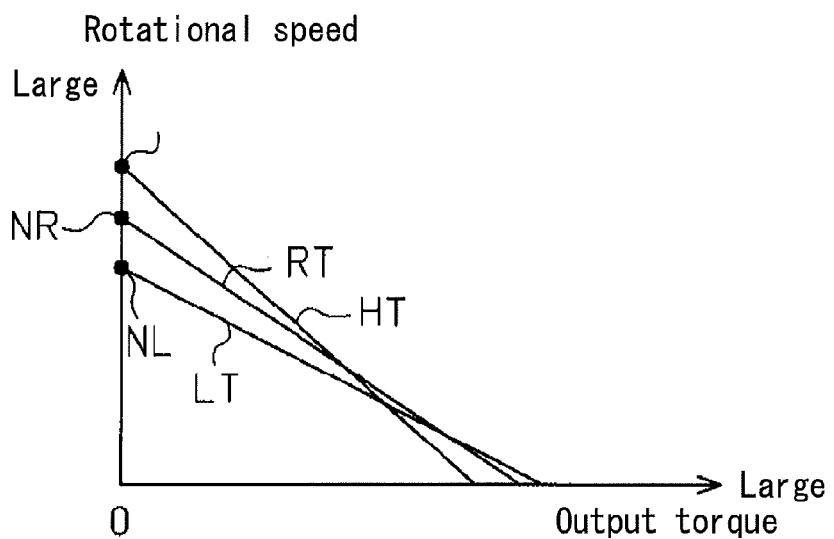
FIG. 8 is a diagram illustrating a relationship between an output torque and a rotational speed according to the first embodiment.

FIG. 8 is a diagram schematically illustrating relationships between an output torque and a rotational speed of a DC motor (an AC motor) at three different motor temperatures (an ambient temperature or an environmental temperature) when a terminal voltage is constant. As illustrated in FIG. 8, generally, when a motor temperature is at a predetermined normal temperature RT, an average rotational speed N is NR in a state where an output torque T of the DC motor is zero (an unloaded state). An amount of change (an increased amount) $\Delta T$ of the output torque T relative to a predetermined amount of change (a decreased amount) $\Delta N$ of the rotational speed N originated from the rotational speed NR in the unloaded state, is a substantially constant ratio SR ($=\Delta T/\Delta N$).

When a motor temperature is at a predetermined high temperature HT, which is higher than the predetermined normal temperature RT, an average rotational speed N is NH in a state where the output torque T of the DC motor is zero. The rotational speed NH in the unloaded state is higher than the rotational speed NR. A value (an absolute value) of an amount of change (an increased amount) $\Delta T$ of the output torque T relative to the predetermined amount of change (the decreased amount) $\Delta N$ of the rotational speed N originated from the rotational speed NH in the unloaded state, is a substantially constant ratio SH, which is smaller than a value of the ratio SR.

When a motor temperature is at a predetermined low temperature LT, which is lower than the predetermined normal temperature RT, an average rotational speed N is NL in a state where the output torque T of the DC motor is zero. The rotational speed NL in the unloaded state is lower than the rotational speed NR. A value (an absolute value) of an amount of change (an increased amount) $\Delta T$ of the output torque T relative to the predetermined amount of change (the decreased amount) $\Delta N$ of the rotational speed N originated from the rotational speed NL in the unloaded state, is a substantially constant ratio SL, which is larger than the value of the ratio SR.

In other words, a motor temperature is estimatable on the basis of the rotational speed N of the DC motor when the DC motor is in the unloaded state (including a low loaded state, which is approximately similar to the unloaded state). For example, when the rotational speed N of the DC motor is larger than the rotational speed NR in the unloaded state, the motor temperature is estimated to be higher than the predetermined normal temperature RT. When the rotational speed N of the DC motor is smaller than the rotational speed NR, the motor temperature is estimated to be lower than the predetermined normal temperature RT. Further, when the motor temperature is higher than the predetermined normal temperature RT, a value (an absolute value) of the amount of change ΔT of the output torque T relative to the predetermined amount of change (the decreased amount) ΔN is small. When the motor temperature is lower than the predetermined normal temperature RT, a value (an absolute value) of the amount of change ΔT of the output torque T relative to the predetermined amount of change (the decreased amount) ΔN is large. Therefore, when an amount of change of rotational speed (the rotational speed difference between the rotational speeds N in the unloaded state and a current rotational speed N) originated from the rotational speed N in the unloaded state, is the same, an amount of change ΔT of the output torque T originated from the output torque T in the unloaded state, is larger at a low motor temperature than at a high motor temperature.

According to the first embodiment, the above-described temperature characteristic of a motor is considered. In other words, when the absolute value DN of rotational speed difference between rotational speeds No of the second DC motor 11 in the unloaded state and the current rotational speed N of the second DC motor 11 is the same, a rotational torque difference (corresponding to the load) between an output torque T of the second DC motor 11 in the unloaded state and a current output torque T of the second DC motor 11 is estimated to be larger at the low motor temperature than at the high motor temperature. More specifically, an absolute value detection threshold value Ta (a threshold value), which is compared with the absolute value DN of the rotational speed difference in order to determine a sandwiching of an object, is set to be smaller at the low motor temperature than the high motor temperature. In other words, when the detected absolute value DN of the rotational speed difference is the same, the sandwiching of the object is determined more easily at the high motor temperature than at the low motor temperature.

Figure 9:
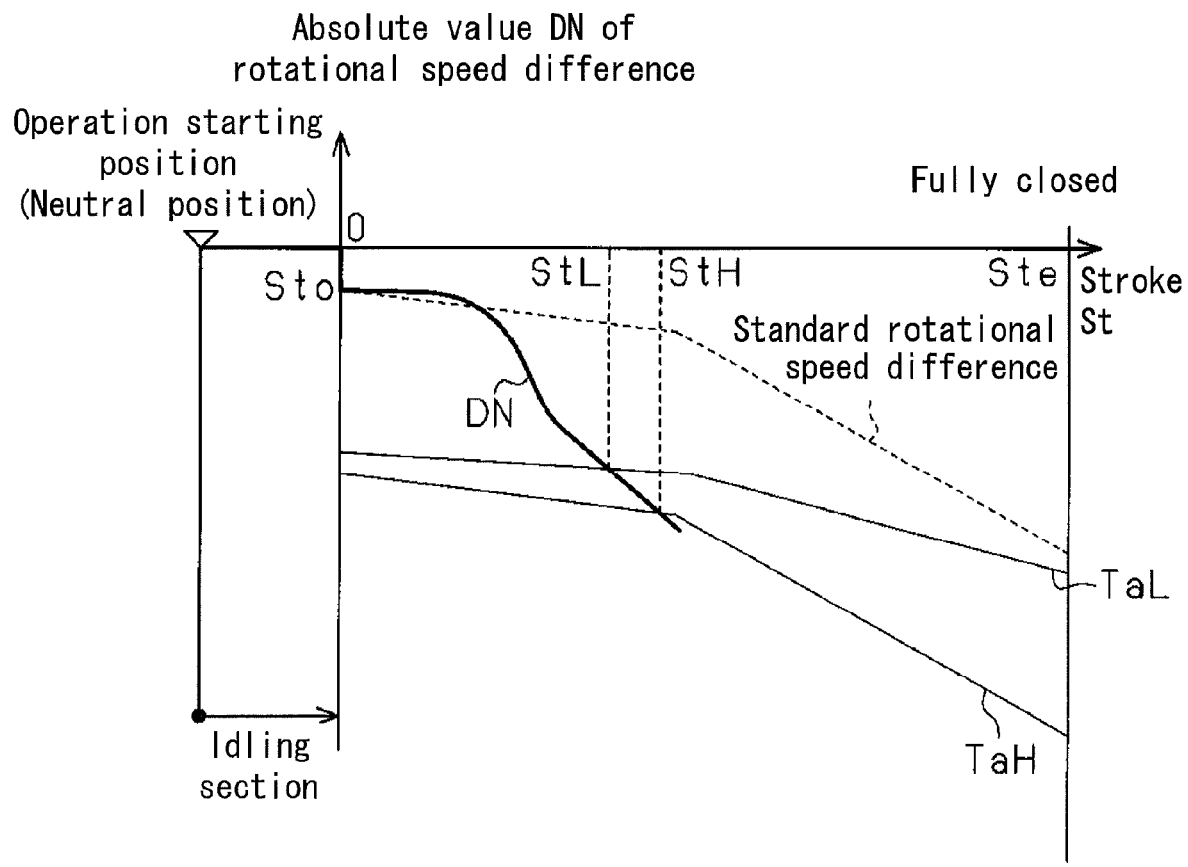
FIG. 9 is a diagram illustrating a change of an absolute value of a rotational speed difference relative to a stroke of a DC motor.

FIG. 9 is a diagram illustrating a relationship between the absolute value DN of the rotational speed difference of the second DC motor 11 and a stroke (a rotational amount) of the second DC motor 11, which corresponds to the opening/closing position of the back door 3 and to the pivot position of the active lever 24, when the second DC motor 11 is started to drive in response to switching of the latch mechanism 12 to the half-latched state, so as to switch the latch mechanism 12 to the fully-latched state. The absolute value DN of the rotational speed difference (a positive number) is shown at a lower side of a longitudinal axis in FIG. 9 for a descriptive purpose. As described above, an idling section is provided, in which the active lever 24 idly pivots for the first predetermined angle θ1 from the original position until the active lever pin 25 thereof contacts the first engagement tab 26c, and the second DC motor 11 is determined to be in the unloaded state at a point immediately before a stroke Sto of the second DC motor 11, at which the idling section ends, while the absolute value DN of the rotational speed difference at the point is determined to be zero. In other words, according to the first embodiment, the unloaded state is defined to be a state where the active lever 24 engages with neither the passive lever 26 nor the bell crank 32. As illustrated by dashed line in FIG. 9, the absolute value DN of the rotational speed difference (which will be also referred to as a standard rotational speed difference hereinafter), which is calculated on the basis of a stroke St of the second DC motor 11, starts to increase (is displaced to the lower side of the longitudinal axis) in a stepped manner immediately after the stroke Sto, at which the idling section ends, and continues to increase to the stroke Ste of the second DC motor 11, at which switching of the latch mechanism 12 to the fully-latched state is completed. The standard rotational speed difference increases in such a manner from the following reasons: The rotational speed N of the second DC motor 11 sharply decreases when the active lever 24 starts to thrust the first engagement tab 26c by means of the active lever pin 25 immediately after the stroke Sto; and The rotational speed N of the second DC motor 11 continues to decrease while a door reaction force (an elastic force of a weather strip for fluid-tightly sealing the back door 3), which acts as a load, continues to increase according to the closing operation of the back door 3 in response to an increase of the stroke St of the second DC motor 11.

According to the first embodiment, the absolute value detection threshold value Ta for determining the sandwiching of the object is calculated, using the following formula, on the basis of the standard rotational speed difference shown by the dashed line in FIG. 9.

$Ta$=standard rotational speed difference×$G$−$Z$

G is a temperature correction gain, which is set to be 1 when the motor temperature is high (No≥NR) while being set to be ½ when the motor temperature is low (No<NR). Z is a sandwiching determination torque, which is set to be a predetermined value on the basis of the rotational speed difference corresponding to a load generated when the sandwiching occurs.

As illustrated in FIG. 9, an absolute value detection threshold value TaH for the high motor temperature is larger than the standard rotational speed difference, shown by the dashed line in FIG. 9, by an amount of the sandwiching determination torque Z, while an absolute value detection threshold value TaL for the low motor temperature is smaller than the absolute value detection threshold value TaH for the high motor temperature and an inclination thereof is ½ of the absolute value detection threshold value TaH for the high motor temperature. Thus, the absolute value detection threshold value Ta is set so that the absolute value detection threshold value TaL for the low motor temperature is smaller than the absolute value detection threshold value TaH for the high motor temperature. Accordingly, even when the absolute value DN of the rotational speed difference is the same, the sandwiching of the object is more easily determined at the low motor temperature than at the high motor temperature.

A manner of controlling of the door lock device 10 (the door lock drive unit 50) by means of the door ECU 40 at the time of the closing operation of the back door 3 will be described hereinafter. First, when it is detected that the active lever 24 is in the idling section 24 on the basis of the detection signal from the position switch 52 and the pulse signals from the pulse sensor 51, the current rotational speed N of the second DC motor 11 and the predetermined rotational speed NR of the second DC motor 11 within the idling section are compared to each other. When the current rotational speed N of the second DC motor 11 is determined to be equal to or larger than the predetermined rotational speed NR of the second DC motor 11, the motor temperature is estimated to be high, and the absolute value detection threshold value Ta is set to be the absolute value detection threshold value TaH for the high motor temperature. On the other hand, when the current rotational speed N of the second DC motor 11 is determined to be smaller than the predetermined rotational speed NR of the second DC motor 11, the motor temperature is estimated to be low, and the absolute value detection threshold value Ta is set to be the absolute value detection threshold value TaL for the low motor temperature.

After the active lever 24 starts to thrust the passive lever 26 by means of the active lever pin 25, and the rotational speed difference starts to change (the absolute value DN of the rotational speed difference starts to increase) accordingly, the absolute value DN of the rotational speed difference and the absolute value detection threshold value Ta (TaH or TaL) are compared to each other. When the absolute value DN of the rotational speed difference is determined to be larger than the absolute value detection threshold value Ta, it is determined that the load corresponding to the sandwiching is generated, and a predetermined process for dealing with the sandwiching is executed (for example, the second DC motor 11 is stopped or rotated in the opposite direction).

The changing of the absolute value DN of the rotational speed difference at the time of occurrence of the sandwiching is also illustrated in FIG. 9 by a heavy solid line. As illustrated in FIG. 9, when the motor temperature is estimated to be low, and the absolute value detection threshold value Ta is set to be the absolute value detection threshold value TaL for the low motor temperature, the sandwiching is determined at a stroke StL where the absolute value DN of the rotational speed difference exceeds the absolute value detection threshold value TaL for the low motor temperature. On the other hand, when the motor temperature is estimated to be high, and the absolute value detection threshold value Ta is set to be the absolute value detection threshold value TaH for the high motor temperature, the sandwiching is determined at a stroke StH (>StL) where the absolute value DN of the rotational speed difference exceeds the absolute value detection threshold value TaH for the high motor temperature. Thus, the sandwiching of the object is appropriately determined on the basis of the absolute value DN of the rotational speed difference (the rotational torque difference that corresponds to the load) with reference to the temperature characteristics of the motor.

Figure 10:
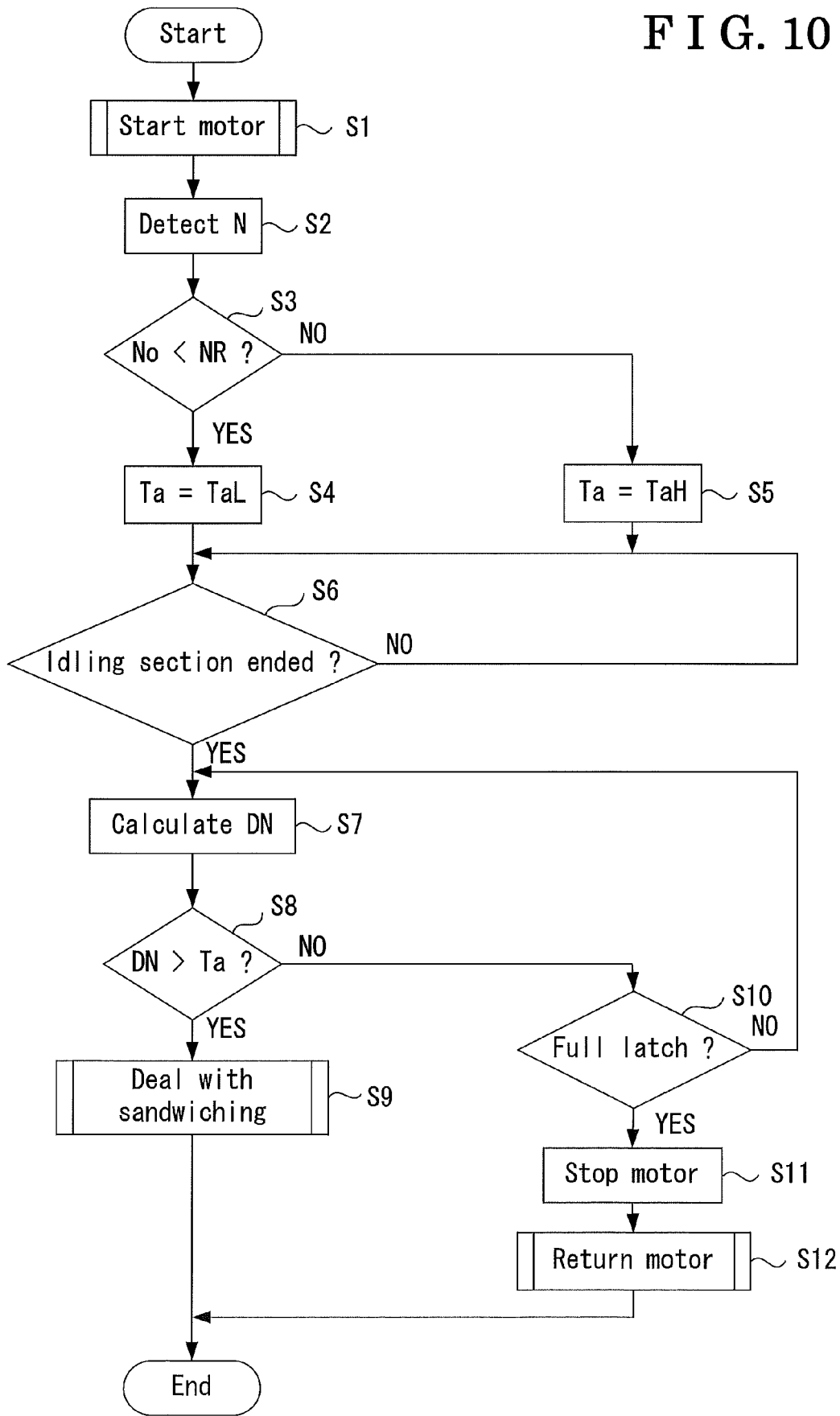
FIG. 10 is a flow chart illustrating a controlling of the opening-and-closing member drive control apparatus for the vehicle according to the first embodiment.

The manner of controlling the door lock device 10 (the door lock drive unit 50) by means of the door ECU 40 at the time of executing the closing operation on the back door 3 will be described hereinafter with reference to a flow chart in FIG. 10. The process is started when the closing operation of the back door 3 is, for example, manually or electrically executed and the half-latched state of the latch mechanism 12 is determined on the basis of the detection signal outputted from the half latch switch 53.

When the process is shifted to a routine, first, the second DC motor 11 is started in order to switch the latch mechanism 12 to the fully-latched state (S1). Second, the rotational speed No of the second DC motor 11 is detected during the idling section until the stroke St of the second DC motor 11 reaches the stroke Sto (S2).

Subsequently, it is determined whether or not the rotational speed No is smaller than the rotational speed NR in the unloaded state (S3). When the rotational speed No is determined to be smaller than the rotational speed NR, the absolute value detection threshold value Ta is set to be the absolute value detection threshold value TaL for the low motor temperature (S4) while when the rotational speed No is determined to be equal to or larger than the rotational speed NR, the absolute value detection threshold value Ta is set to be the absolute value detection threshold value TaH of the high motor temperature (S5).

Subsequently, whether or not the idling section is ended is determined (S6). After the ending of the idling section is determined, the absolute value DN of the rotational speed difference is calculated (S7). Then, it is determined whether or not the absolute value DN of the rotational speed difference exceeds the absolute value detection threshold value Ta (TaH or TaL) (S8). When the absolute value DN of the rotational speed difference is determined to exceed the absolute value detection threshold value Ta, it is determined that the load corresponding to the sandwiching is detected, and a known process for dealing with the sandwiching is executed (for example, the second DC motor 11 is stopped or rotated in the opposite direction) (S9). Then the process is completed.

On the other hand, when the absolute value DN of the rotational speed difference is determined to be smaller than the absolute value detection threshold value Ta, it is determined whether or not the switching to the fully-latched state is completed (S10). When the switching to the fully-latched state is determined so as not to be completed, the process returns to S7, and a similar process is repeated. In other words, the calculation of the absolute value DN of the rotational speed difference and the detection of the sandwiching on the basis of the comparison between the calculated absolute value DN of the rotational speed difference and the absolute value detection threshold value Ta are successively repeated during a period between the end of the idling section and the completion of the switching to the fully-latched state.

When the switching to the fully-latched state is determined to be completed in S10, the second DC motor 11 is stopped (S11). Then, the second DC motor 11 starts to be returned (rotated in the opposite direction) so that the active lever 24 pivotably returns to the original position, and when the active lever 24 returns to the original position, the second DC motor 11 is stopped (S12). Then the process is completed.

The following effects may be obtained according to the above-described first embodiment. According to the first embodiment, the temperature of the second DC motor 11 is estimated on the basis of the rotational speed No of the second DC motor 11 that is detected during the idling section. When the estimated temperature of the second DC motor 11 is high (No>NR), the absolute value detection threshold value Ta is corrected so that a determination sensitivity of the sandwiching of the object by means of the door ECU 40 is relatively decreased. Therefore, it may be restricted to mistakenly determine the sandwiching of the object, which is caused by a determination of an excessive load (rotational torque difference). On the other hand, when the estimated temperature of the second DC motor 11 is low (No<NR), the absolute value detection threshold value Ta is corrected so that the determination sensitivity of the sandwiching of the object by means of the door ECU 40 is relatively increased. Therefore, the sandwiching may be quickly determined and the load, generated when the sandwiching occurs, may be decreased.

According to the first embodiment, the idling section where the active lever 24 idly pivots from the original position until starting to drive the passive lever 26 (the idling section where the second DC motor 11 starts to be rotated from an original rotational position until starting to drive the passive lever 26 via the pinion 22 and the active lever 24) is set to be longer than the idling section where the active lever 24 idly pivots from the original position until starting to drive the bell crank 32 (the idling section where the second DC motor 11 starts to be rotated from the original rotational position until starting to drive the bell crank 32 via the pinion 22 and the active lever 24) ($\theta1>\theta2$). Therefore, the motor temperature may be appropriately estimated on the basis of the rotational speed difference No that is stabilized during the idling section. Accordingly, the sandwiching of the object is more appropriately determined.

According to the first embodiment, the absolute value DN of the rotational speed difference is used. Therefore, variation in the rotational speed difference No of each product in the unloaded state may not influence the determination of the load (corresponding to the rotational torque difference) at the time of the closing operation of the back door 3.

Second Embodiment

A second embodiment of the opening-and-closing member drive control apparatus for the vehicle 1 will be described hereinafter with reference to the attached drawings. The second embodiment differs from the first embodiment in that the standard rotational speed difference (a standard moving speed change) corresponding to a sliding resistance at the time of the closing operation of the back door 3, is correctable on the basis of the estimated temperature (an environmental temperature) of the second DC motor 11. Therefore, a detailed description for similar configurations will be omitted.

Figure 11:
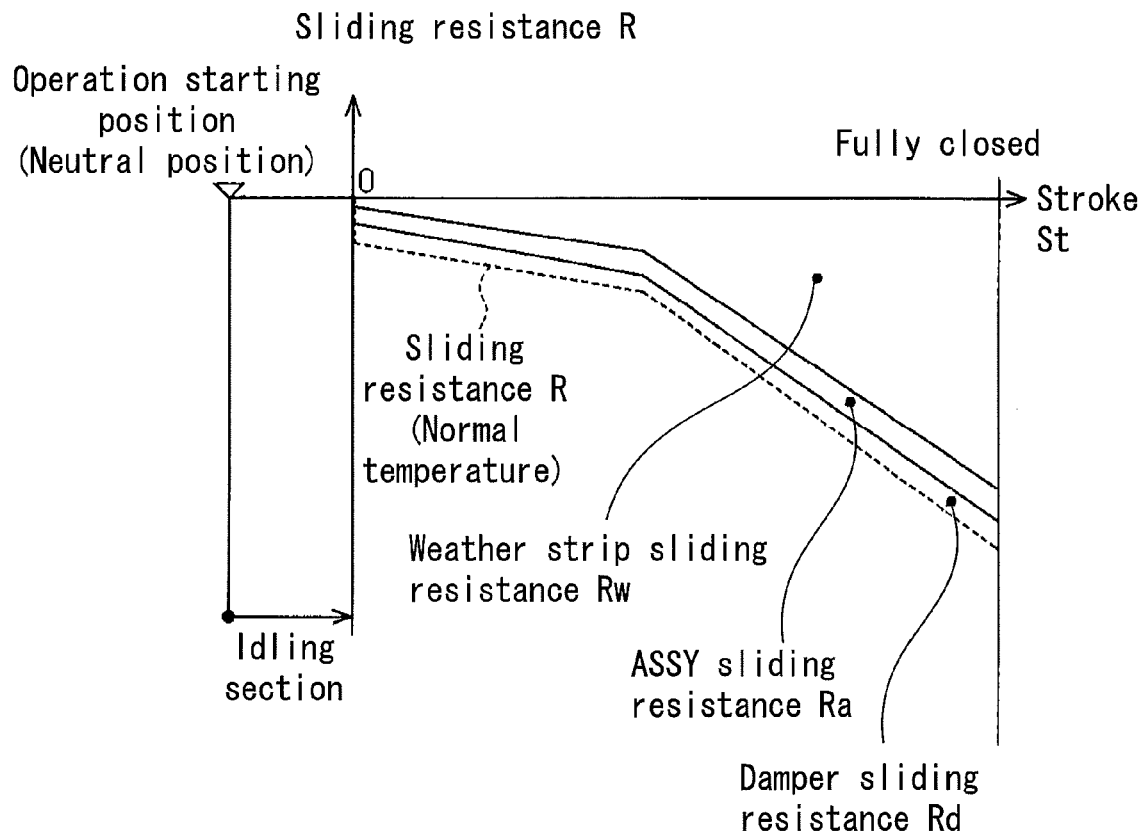
FIG. 11 is a diagram illustrating a change of sliding resistance relative to the stroke of the DC motor according to a second embodiment.

FIG. 11 is a diagram illustrating a relationship between the stroke St of the second DC motor 11 and a sliding resistance R at the normal temperature when the second DC motor 11 is started to drive in response to the switching of the latch mechanism 12 to the half-latched state, so as to switch the latch mechanism 12 to the fully-latched state. The sliding resistance R (a positive number) is shown at a lower side of a longitudinal axis in FIG. 11 for a descriptive purpose.

As illustrated in FIG. 11, the sliding resistance R is configured by a weather strip sliding resistance Rw, which is caused by an interference with a weather strip, an ASSY sliding resistance Ra, which is caused by an operation of the door lock device 10 and the like, and a damper sliding resistance Rd, which is caused by an operation of the gas damper 6 and the like. Each of the sliding resistances Rw, Ra and Rd are experimentally obtained relative to the stroke St of the second DC motor 11.

It is confirmed that each of the sliding resistances Rw, Ra and Rd varies depending on the environmental temperature. According to the second embodiment, the sliding resistance Rw, Ra and Rd of each of the components is corrected according to a temperature of each of the components and the sliding resistances Rw, Ra and Rd of the all components are added in order to obtain the sliding resistance R, in which the temperature characteristic of each of the components is considered. In other words, the sliding resistance R is calculated according to the following formula 1, using a temperature correction gain Gw for describing the temperature characteristic of the weather strip sliding resistance Rw, a temperature correction gain Ga for describing the temperature characteristic of the ASSY sliding resistance Ra and a temperature correction gain Gd for describing the temperature characteristic of the damper sliding resistance Rd.

$$\text{Sliding resistance } R=(Rw\times Gw)+(Ra\times Ga)+(Rd\times Gd) \qquad 1$$

Each of the temperature correction gains Gw, Ga and Gd may be changed continuously or in a phased manner on the basis of the estimated temperature of the second DC motor 11 (the rotational speed No of the second DC motor 11 in the unloaded state (the idling section)).

A standard rotational speed difference V is calculated according to the following formula 2, using a coefficient K for describing a rotational speed of the second DC motor 11 per load (per sliding resistance). The standard rotational speed difference V is calculated according to the sliding resistance R, in which the temperature characteristic of each of the components is considered.

$$\text{Standard rotational speed difference } V=K\times R \qquad 2$$

Figure 12:
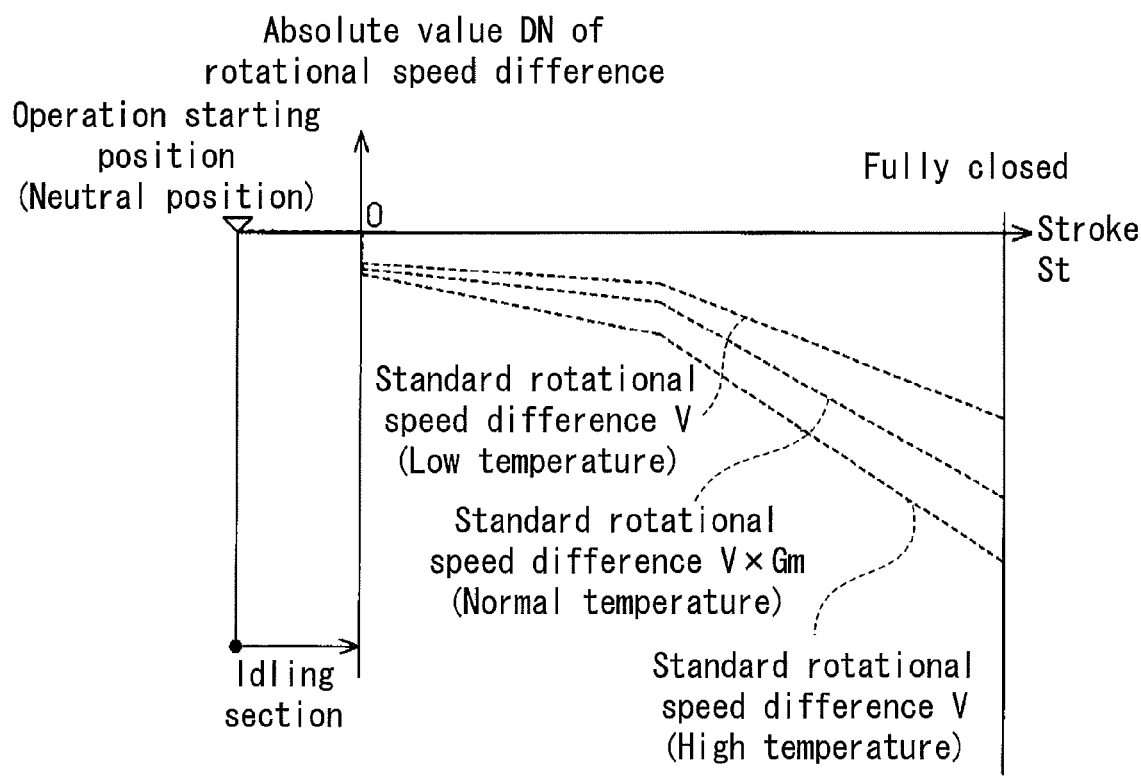
FIG. 12 is a diagram illustrating a change of a corrected standard rotational speed difference relative to the stroke of the DC motor according to the second embodiment.

FIG. 12 illustrates a relationship between the stroke St of the second DC motor 11 and a corrected standard rotational speed difference (=V×Gm), in which the standard rotational speed difference V is multiplied by a temperature correction gain Gm representing the temperature characteristic of the second DC motor 11. The corrected standard rotational speed difference (a positive number) is shown at a lower side of a longitudinal axis in FIG. 12 for a descriptive purpose. According to the second embodiment, the temperature correction gain Gm is selected from three stages on the basis of the estimated temperature of the second DC motor 11, and the standard rotational speed difference V is corrected on the basis of the selected stage of the temperature correction gain Gm. In other words, the standard rotational speed difference V is corrected on the basis of the temperature correction gain Gm that is selected from the three stages, including the normal temperature, in which the estimated temperature of the second DC motor 11 is within the predetermined temperature range, the low temperature, which is lower than the normal temperature and the high temperature, which is higher than the normal temperature. Similarly to the first embodiment, the corrected standard rotational speed difference is set to be relatively smaller at the low motor temperature than the high motor temperature.

The absolute value detection threshold value Ta for determining the sandwiching is calculated according to the following formula 3 on the basis of the corrected standard rotational speed difference and a sandwiching determination load FL.

$$\text{Absolute value detection threshold value } Ta=V\times Gm+(K\times FL)\times Gm \qquad 3$$

The sandwiching determination load FL corresponds to the sandwiching determination torque, which is set to be a predetermined value on the basis of the rotational speed difference corresponding to the load generated when the sandwiching occurs. In other words, according to the second embodiment, when the absolute value detection threshold value Ta is calculated, the temperature characteristic of the second DC motor 11 is also reflected in the load generated at the time of sandwiching (FL).

Figure 13:
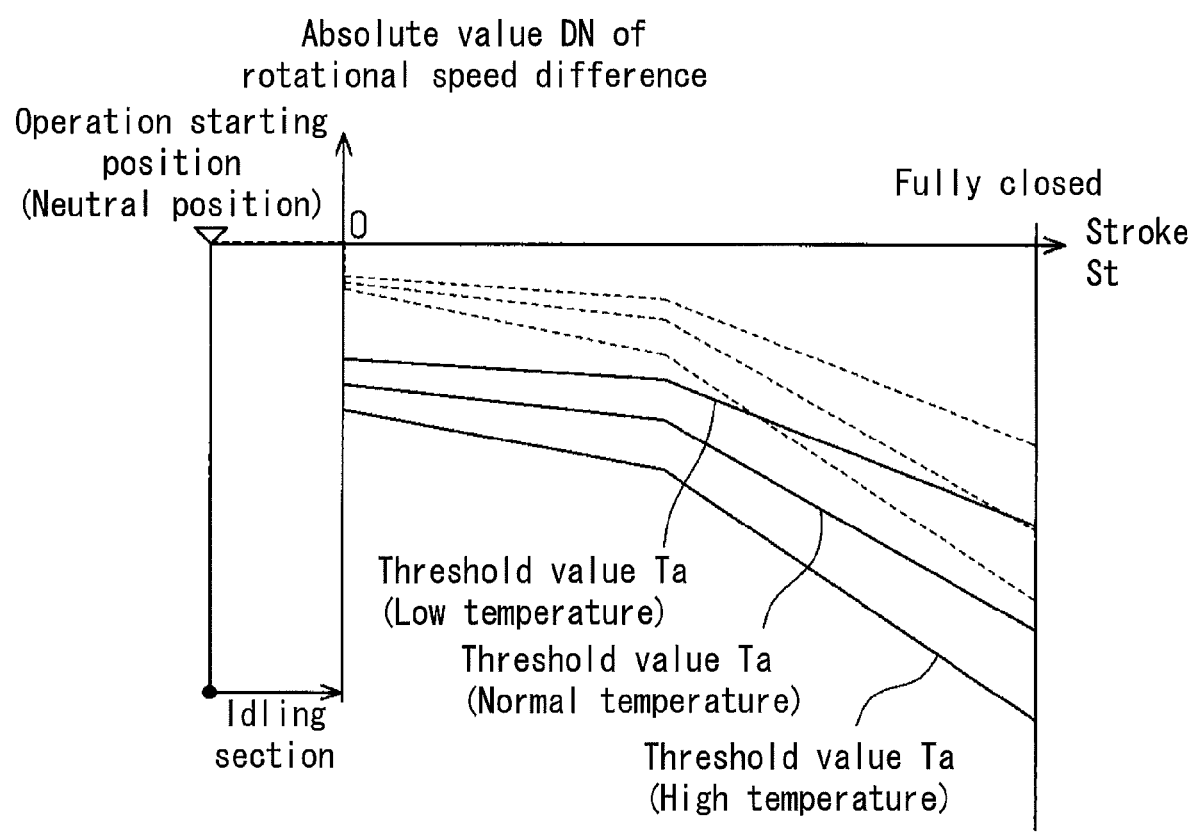
FIG. 13 is a diagram illustrating a change of an absolute value detection threshold value relative to the stroke of the DC motor according to the second embodiment.

FIG. 13 illustrates a relationship between the stroke St of the second DC motor 11 and the absolute value detection threshold value Ta that is calculated in the above-described manner. The absolute value detection threshold value Ta (a positive number) is shown at a lower side of a longitudinal axis in FIG. 13 for a descriptive purpose. As illustrated in FIG. 13, the absolute value detection threshold value Ta is calculated on the basis of the temperature correction gain Gm that is selected from the three stages of the temperature (the normal temperature, the low temperature and the high temperature) of the second DC motor 11. The calculation of the absolute value detection threshold value Ta according to the temperature of the second DC motor 11 and the like is similar to the processes S3 to S5 of the first embodiment.

Similarly to the first embodiment, when it is determined that the absolute value DN of the rotational speed (see FIG. 9) exceeds the absolute value detection threshold value Ta, which is calculated and set according to the temperature of the second DC motor 11 in the above-described manner, the generation of the load corresponding to the occurrence of the sandwiching is determined, and the predetermined process for dealing with the sandwiching is executed. Further, similarly to the first embodiment, the absolute value detection threshold value Ta is set to be smaller at the low motor temperature than at the high motor temperature. Therefore, even when the absolute value DN of the rotational speed difference is the same, the sandwiching of the object is more easily determined at the low motor temperature.

As described above, according to the second embodiment, the following effect may be obtained in addition to the effects of the first embodiment. According to the second embodiment, the standard rotational speed difference V is corrected on the basis of the estimated temperature of the second DC motor 11 (the environmental temperature corresponding to the temperature of the second DC motor 11). Therefore, the temperature characteristics of the components (the weather strip, the door lock device 10 and the gas damper 6), which relate to the sliding resistance R, is reflected in the absolute value detection threshold value Ta. Accordingly, credibility of the sandwiching of the object may be improved.

The first and second embodiments may be modified as follows. In the first embodiment, the absolute value detection threshold value Ta may be selectively set from more than three stages on the basis of the rotational speed No in the unloaded state (the idling section) of the second DC motor 11. Further, alternatively, the absolute value detection threshold value Ta may be repeatedly changed on the basis of the rotational speed No. In such a case, a dead band may be applied where the absolute value detection threshold value Ta is not changed on the basis of the rotational speed No within a predetermined intermediate range.

In the second embodiment, the temperature correction gain Gm for calculating the absolute value detection threshold value Ta and the like may be selected from two stages or from four stages or more on the basis of the estimated temperature of the second DC motor 11 (the rotational speed No). Alternatively, the temperature correction gain Gm may be repeatedly modified on the basis of the estimated temperature of the second DC motor 11.

In the first and second embodiments, timing of the detection of the rotational speed No of the second DC motor 11 in the unloaded state (the idling section) may be selectable. For example, the rotational speed N may be detected at an end of the idling section where the rotational speed N is expected to stabilize. Alternatively, the rotational speed N may be successively detected, and only when a difference between the latest rotational speed N and the current rotational speed N is within a predetermined range, the rotational speed N may be used.

In the first and second embodiments, the position switch 52 for detecting the original position (the neutral position) of the active lever 24 may be substituted with the pulse sensor 51. More specifically, the original position (the neutral position) may be detected in a manner where the number of pulse signals, outputted from the pulse sensor 51, is counted immediately after the switching to the unlatched state, until the number of pulse signals become equal to a predetermined number of pulse signals corresponding to the original position of the active lever 24.

In the first and second embodiments, the idling section of the active lever 24 (the second DC motor 11) may extend until the passive lever 26, which is thrust by the active lever pin 25 at the first engagement tab 26*c*, contacts the driven protruding portion 13*f* of the latch 13. In other words, the idling section of the second DC motor 11 may extend to a selective rotational position (a stroke), as long as the latch 13 is not operated. In such a case, although the rotational speed N and the like of the second DC motor 11 may vary in two stages, the motor temperature may be estimated on the basis of the rotational speed N within the idling section, which is set to extend longer.

In the first and second embodiments, the absolute value DN of the rotational speed difference is used in order to determine the load at the time of the closing operation of the back door 3. However, the rotational speed difference may be directly used to estimate the load at the time of the closing operation of the back door 3. In such a case, the comparison between the rotational speed difference and the detection threshold value for determining the sandwiching of the object is set to be consistent with a positive or negative value of the rotational speed difference.

In the first and second embodiments, the moving speed of the back door 3 is detected on the basis of the rotational speed of the second DC motor 11. However, the moving speed of the back door 3 may be directly detected. Further, when the door ECU 40 controls the driving of the door drive unit 7 at the time of the closing operation of the back door 3 in order to determine the sandwiching of the object on the basis of the rotational speed difference (DN) of the first DC motor 71, information about a motor temperature, which is estimated in the control of the driving of the door lock drive unit 50, may be obtained (shared) in order to change the detection threshold value for determining the sandwiching.

When the door ECU 40 controls the driving of the door drive unit 7 in order to execute the closing operation of the back door 3 and a temperature of the first DC motor 71 is estimated individually, the rotational speed (No) in the unloaded state may be detected during an idling period where the electromagnetic clutch 72 is in a disconnected state, and the temperature of the first DC motor 71 may be estimated in the similar manner.

A function for switching the door lock device 10 from the fully-latched state to the unlatched-state may be omitted. Further, a swing door, a slide door, a trunk lid, a sun roof, a window panel and the like may serve as the opening-and-closing member. A drive mechanism for mechanically connecting the opening-and-closing member and motors may be selectively provided as long as the idling section (the idling period) is provided for the motors. For example, a link mechanism, a cam mechanism, a gear mechanism, a cable transmission mechanism (a rope, a belt), a screw mechanism and a combination thereof may be provided.

The moving speed changing value for determining the sandwiching of the object may be one of a moving speed difference between either a moving speed of the opening-and-closing member in a predetermined section or a standard moving speed defined by a predetermined moving speed and a current moving speed that is detected subsequently, an integrated value of the moving speed difference, and a moving speed changing amount within a predetermined period (for example a unit of time or a unit of moving amount).

The opening-and-closing member drive control apparatus for the vehicle 1 may be applied so as to determine the sandwiching of the object when the opening-and-closing member is driven to be opened.

Accordingly, it is known that the rotational speed of the motor is smaller at the low motor temperature than at the high motor temperature when the motor is in the unloaded state (corresponding to the idling period/idling section). Further, it is also known that the moving speed changing value, including one of the moving speed difference between either the moving speed of the opening-and-closing member in the predetermined section or the standard moving speed defined by the predetermined moving speed and the moving speed that is subsequently detected, the integrated value of the moving speed difference, and the moving speed changing amount within a predetermined period, varies depending on the motor temperature. Accordingly, the temperature of the motor is estimated on the basis of the rotational speed No of the motor that is detected during the idling section. When the estimated temperature of the motor is high (at the high motor temperature), the absolute value detection threshold value Ta is corrected so that the determination sensitivity of the sandwiching of the object by means of the door ECU 40 is relatively decreased. Therefore, it may be restricted to mistakenly determine the sandwiching of the object, which is caused by a determination of an excessive load (moving speed changing value). On the other hand, when the estimated temperature of the motor is low (at the low motor temperature), the absolute value detection threshold value Ta is corrected so that the determination sensitivity of the sandwiching of the object by means of the door ECU 40 is relatively increased. Therefore, the sandwiching may be quickly determined and the load, generated when the sandwiching occurs, may be decreased.

According to the first and second embodiments, the opening-and-closing member drive control apparatus for the vehicle includes the passive lever 26 driven by the second DC motor 11 so as to transmit the driving force of the second DC motor 11 in one direction to the back door 3, thereby executing a closing operation on the back door 3, and the bell crank 32 driven by the motor so as to transmit the driving force of the second DC motor 11 in the opposite direction to the back door 3, thereby executing an opening operation on the back door 3. The second DC motor 11 is arranged at the predetermined original rotational position so that the idling section is set until the second DC motor 11 starts to drive each of the passive lever 26 and the bell crank 32. The idling section where the second DC motor 11 rotates from the original rotational position until starting to drive the passive lever 26 is set to be longer than the idling section where the second DC motor 11 rotates from the original rotational position until starting to drive the bell crank 32.

Accordingly, the motor temperature may be appropriately estimated on the basis of the rotational speed difference No that is stabilized during the idling section. Accordingly, the sandwiching of the object is more appropriately determined.

According to the second embodiment, the threshold value is calculated on the basis of a standard moving speed change corresponding to a sliding resistance at the time of the closing operation or the opening operation. The correcting means corrects the standard moving speed change on the basis of the estimated temperature of the second DC motor 11.

Accordingly, it is known that the standard rotational speed difference V, corresponding to the sliding resistance R at the time of the closing operation or the opening operation of the back door 3, varies depending on the temperature characteristics of components (for example the weather strip), which relate to the sliding resistance R. The standard rotational speed difference V is corrected on the basis of the estimated temperature of the motor, in other words, the environmental temperature corresponding to the temperature of the motor. Therefore, the temperature characteristics of the components, which relate to the sliding resistance R, is reflected in the absolute value detection threshold value Ta. Accordingly, credibility of the sandwiching of the object may be improved.

According to the first and second embodiments, the door lock device for the vehicle includes the bell crank 32 linked to the latch mechanism 12 and transmitting the driving force of the second DC motor 11 in the opposite direction from a driving direction of the passive lever 26 so as to switch the latch mechanism 12 from the half-latched state or the fully-latched state to the unlatched state. The second DC motor 11 is arranged at the predetermined original rotational position so that the idling section is set until the second DC motor 11 starts to drive each of the passive lever 26 and the bell crank 32. The idling section where the second DC motor 11 rotates from the original rotational position until starting to drive the passive lever 26 is set to be longer than the idling section where the second DC motor 11 rotates from the original rotational position until starting to drive the bell crank 32.

According to the first and second embodiments, the idling section includes at least one of a section set until the second DC motor 11 starts to drive the passive lever 26 and a section set until the bell crank 32 starts to drive the latch mechanism 12.

Accordingly, the idling section includes the section set until the second DC motor 11 starts to drive the passive lever 26, and the section set until the passive lever 26 starts to drive the latch mechanism 12. Therefore, the motor temperature may be estimated more accurately on the basis of the rotational speed N of the motor, which is stabilized within the idling section. Accordingly, the sandwiching of the object may be more accurately determined.

Accordingly, an influence of the temperature characteristic of the motor may be restricted and the sandwiching of the object may be appropriately determined.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door lock device for a vehicle comprising:
    a latch mechanism selectively switched to a fully-latched state for holding a vehicle door in a fully-closed state or a half-latched state for holding the vehicle door in a half-closed state;
    a closing side transmitting member linked to the latch mechanism;
    a motor, a driving force of which is transmitted to the latch mechanism via the closing side transmitting member after an idling section, driving to switch the latch mechanism from the half-latched state to the fully-latched state;
    a rotational speed detecting member for detecting a rotational speed of the motor;
    a calculating means for calculating the rotational speed difference between the rotational speed of the motor detected in the idling section and a current rotational speed of the motor detected subsequently;
    a determining means for determining a sandwiching of an object on the basis of a relationship between the calculated rotational speed difference and a threshold value;
    a temperature estimating means for estimating a temperature of the motor on the basis of the rotational speed of the motor, detected in the idling section; and
    a correcting means for correcting the threshold value so that a determination sensitivity of the sandwiching of the object becomes greater when the estimated temperature of the motor is low than when the estimated temperature of the motor is high.

2. The door lock device for the vehicle according to claim 1 further comprising:
    an opening side transmitting member linked to the latch mechanism and transmitting the driving force of the motor in the opposite direction from a driving direction of the closing side transmitting member so as to switch the latch mechanism from the half-latched state or the fully-latched state to an unlatched state, wherein the motor is arranged at a predetermined original rotational position so that the idling section is set until the motor starts to drive each of the closing side transmitting member and the opening side transmitting member, and wherein the idling section where the motor rotates from the original rotational position until starting to drive the closing side transmitting member is set to be longer than the idling section where the motor rotates from the original rotational position until starting to drive the opening side transmitting member.

3. The door lock device for the vehicle according to claim 1, wherein the idling section includes at least one of a section set until the motor starts to drive the closing side transmitting member and a section set until the closing side transmitting member starts to drive the latch mechanism.

4. The door lock device for the vehicle according to claim 2, wherein the idling section includes at least one of a section set until the motor starts to drive the closing side transmitting member and a section set until the closing side transmitting member starts to drive the latch mechanism.

5. A door lock device for a vehicle comprising:

a latch mechanism selectively switched to a fully-latched state for holding a vehicle door in a fully-closed state, a half-latched state for holding the vehicle door in a half-closed state, or an unlatched state for not holding the vehicle door;

a closing side transmitting member linked to the latch mechanism;

a motor, a driving force of which is transmitted to the latch mechanism via the closing side transmitting member after an idling section so that the closing side transmitting member drives the latch mechanism in one direction to switch the latch mechanism from the half-latched state to the fully-latched state;

an opening side transmitting member linked to the latch mechanism and transmitting the driving force of the motor to the latch mechanism to drive the latch mechanism in an opposite direction to switch the latch mechanism from the half-latched state or the fully-latched state to the unlatched state;

a rotational speed detecting member for detecting a rotational speed of the motor;

a calculating means for calculating the rotational speed difference between the rotational speed of the motor detected in the idling section and a current rotational speed of the motor detected subsequently;

a determining means for determining a sandwiching of an object on the basis of a relationship between the calculated rotational speed difference and a threshold value;

a temperature estimating means for estimating a temperature of the motor on the basis of the rotational speed of the motor, detected in the idling section; and a correcting means for correcting the threshold value so that a determination sensitivity of the sandwiching of the object becomes greater when the estimated temperature of the motor is low than when the estimated temperature of the motor is high.

\* \* \* \* \*